UNITED STATES PATENT OFFICE 2,565,977

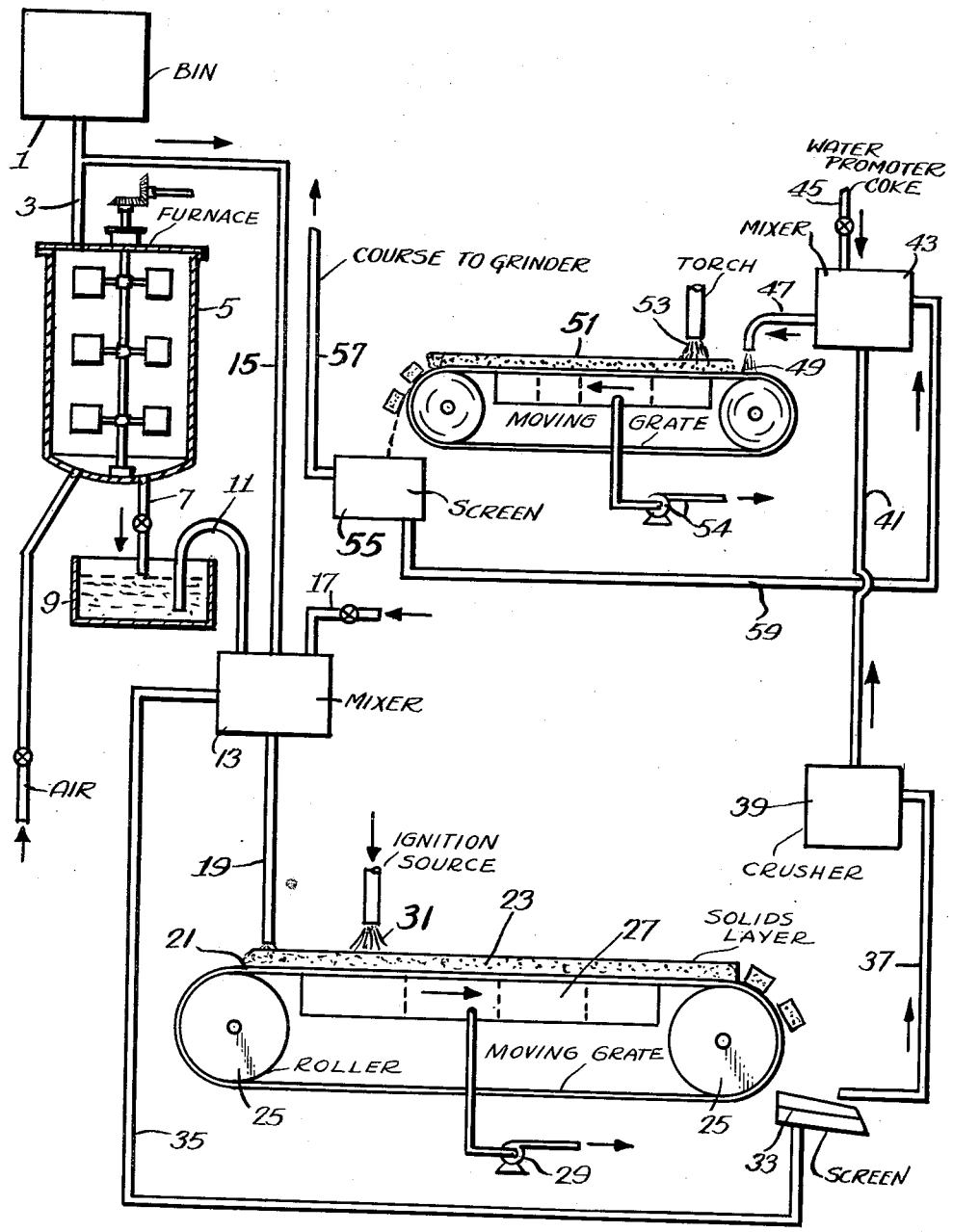

PROCESS FOR THE PREPARATION OF CATALYSTS FOR THE CONVERSION OF CARBON OXIDES WITH HYDROGEN

Don R. McAdams, Baton Rouge, and Marnell A. Segura, Denham Springs, La., assignors to Standard Oil Development Company, a corporation of Delaware Application May 12, 1948, Serial No. 26,554

10 Claims. (Cl. 252—474)

The present invention relates to the catalytic conversion of carbon oxides with hydrogen to produce valuable synthetic products such as normally liquid hydrocarbons and oxygenated organic compounds. More specifically, the invention relates to iron type catalysts for this conversion, which are particularly efficient when employed in fluid catalyst operation.

Iron-type catalysts have been used heretofore in the catalytic synthesis of hydrocarbons and oxygenated products from carbon monoxide and hydrogen. These catalysts are normally employed at relatively high temperatures of about 450° F.–800° F. and relatively high pressures of about 3–100 atm. abs., or higher, to obtain predominantly unsaturated hydrocarbons and oxygenated products, from which motor fuels with high octane ratings may be recovered.

The extreme temperature sensitivity and relatively rapid catalyst deactivation of the hydrocarbon synthesis have led in recent years to various attempts and proposals to employ the so-called fluid catalyst technique wherein the synthesis gas is contacted with a dense turbulent bed of finely divided catalyst fluidized by the gaseous reactants and products and which permits continuous catalyst replacement and greatly improved temperature control. However, the adaptation of the hydrocarbon synthesis to the fluid catalyst technique has encountered serious difficulties, particularly when iron catalysts are used.

Application of the fluid catalyst technique requires ease of fluidization and attrition resistance in addition to the conventional characteristics determining catalyst utility, such as total desired yield, and active catalyst life.

The activity and utility of iron catalysts decline steadily in the course of the strongly exothermic reaction, chiefly due to the deposition of fixed carbon or coke-like materials formed by the dissociation and cracking of CO and unstable hydrocarbons, which take place at the relatively high temperatures and pressures associated with the use of iron-base catalysts.

If allowed to accumulate excessively, these carbon or coke deposits adversely affect particularly those characteristics of the catalyst which determine its utility as a fluidizable solid in processes employing the fluid solids technique. More particularly, carbon or coke deposits have been found to cause rapid disintegration of the catalyst particles leading to a substantial and undesirable expansion of the fluidized bed and ultimately to the requirement of complete catalyst replacement because of fluidization difficulties. Catalyst broken down in this manner must be restored to a fluidizable particle size or is lost for further use.

Iron catalysts are usually prepared by a substantially complete reduction of various natural or synthetic iron oxides, their catalytic activity being enhanced by the addition of such promoters as various compounds of alkali metals or the oxides of chromium, zinc, magnesium, manganese, the rare earth metals, and others, in small amounts of about 0.5–10%. Hydrogen or mixtures of hydrogen and carbon monoxide, such as fresh synthesis gas are normally used as the reducing agent at temperatures of about 600° F.–1600° F. All these catalysts are either subject to excessive carbonization and disintegration in fluid operation or their activity and/or selectivity to useful products are too low for satisfactory operation.

The present invention substantially reduces these difficulties and affords various additional advantages as will be fully understood from the detailed description given below.

It is therefore the principal object of the present invention to provide an improved process for the catalytic conversion of CO with $H_2$.

Another object of the invention is to provide improved iron catalysts for the catalytic conversion of CO with $H_2$ employing the fluid solids technique.

Other objects and advantages will appear hereinafter.

In accordance with the present invention improved iron catalysts are obtained by subjecting iron oxides admixed with small amounts of carbon to a combustion and sintering treatment at temperatures of about 2200° F.–2500° F., preferably followed by a reducing treatment with a gas rich in hydrogen at temperatures of about 600° F.–1100° F. Conventional alkali metal compound promoters may be added at any convenient stage of the process, preferably prior to the combustion and sintering treatment. Iron catalysts prepared in this manner have been found to have substantially lower carbonization and disintegration tendencies and at least equal activity and selectivity to desirable products, particularly in fluid operation, as compared with iron-type catalysts prepared by conventional methods.

Catalysts in accordance with the present invention may be most conveniently prepared by mixing iron oxide crushed to about $1/8''$–$1/4''$ size with about 2–8%, preferably about 5% by weight of carbon, preferably in the form of coke, such as metallurgical coke, which has been moistened with about 3–10% of water based on iron oxide. The water serves as a binder permitting air to penetrate the mixture and also serves to control the rate of carbon combustion as will appear more clearly hereinafter. If desired, the alkali metal compound or other promoter may be added to the water used for moistening the carbon. The mixture of iron oxide and carbon may be ignited by any suitable means and the carbon subjected to combustion with air in such a manner that the iron oxide is subjected to sintering temperatures of about 2200° F.–2500° F. for about 0.5–2, preferably about 1 minute. The caked sinter may be cooled, crushed, ground to the desired size and reduced in a conventional manner.

While substantial improvements may be realized when preparing the catalysts of the present invention from any desired iron oxides such as precipitated iron oxides, fused magnetite, or other natural or synthetic iron oxides the invention affords greatest advantages when applied to sintered iron pyrites ashes. This material is extremely inexpensive and readily available. As mentioned before, it has been used before as a synthesis catalyst, after promoter addition and adequate reduction. Activity and selectivity of these cheap catalysts have been comparable to those of more expensive iron-type preparations. However, carbonization and disintegration of these pyrites catalysts are so pronounced as to seriously interfere with satisfactory fluid operation. It has now been found that these pyrites ashes when treated in accordance with the present invention exhibit carbonization and disintegration rates which are only a small fraction of those of conventional iron pyrites catalysts, while their activity and selectivity are at least the same and often even appreciably higher. It is possible therefore, in accordance with the present invention, to prepare from the cheapest iron-bearing raw materials by relatively simple and inexpensive means an iron-type catalyst which is at least equal and in many cases superior to the most expensive conventional iron-type catalysts with respect to all essential characteristics such as activity, selectivity, and disintegration resistance.

It has further been found that the carbonization and disintegration tendencies of the catalysts of the present invention may be reduced to an even greater extent without significant losses in activity and selectivity, when an amount of about 2 to 15% by weight of such a metal as antimony, vanadium, manganese and particularly copper, or about 25–50% of aluminum, all calculated as oxides, is incorporated into the catalyst, preferably prior to sintering in the presence of carbon. These metals may be added in the form of their oxides or compounds convertible into oxides at elevated temperatures such as the carbonates or nitrates to the mixture to be subjected to sintering in the presence of carbon at the conditions specified above.

Having set forth its general nature, the invention will be best understood from the following more detailed description wherein reference will be made to the accompanying drawing, the single figure of which shows a semi-diagrammatical view of a system for carrying out a preferred embodiment of the invention.

The system of the drawing is particularly adapted to the preparation of catalysts in accordance with the present invention from iron pyrites which is the preferred starting material of the invention. It should be understood, however, that the system illustrated may, in its essential parts, be applied in a generally analogous manner to iron oxides of other origin.

Referring now in detail to the drawing, the system illustrated therein comprises a mostly conventional iron pyrites roasting and sintering plant including the elements numbered 1 to 35 and a sintering plant constituting the essential feature of the present invention, which includes the system elements numbered 37 to 57. The function and cooperation of these apparatus elements will be forthwith explained.

In operation, a container or bin 1 is supplied with an iron pyrites concentrate which may have been obtained by flotation-separation of mixed iron pyrites—iron-copper pyrites ores. These concentrates consist mostly of $FeS_2$ containing small amounts of impurities such as $SiO_2$, $Al_2O_3$, $CaO$, $MgO$ and $CuO$.

The $FeS_2$ concentrate may be passed from bin 1 through line 3 to roasting furnace 5 which may be of the Herreshoff or any other suitable type. In furnace 5, the $FeS_2$ is blown with air at suitable roasting temperatures of about 700° F.–1200° F. The air may be admixed with a minor proportion of recycled product $SO_2$. The roasted material is withdrawn through bin 7 in the form of so-called "calcines" containing about 8% sulfur.

The calcines are permitted to cool in bin 9 from which they are transferred through line 11 to a mixer 13. $FeS_2$ and water are added through lines 15 and 17, respectively, to adjust the sulfur and moisture content of the material. The mixed material which now contains just sufficient sulfur to serve as fuel in the subsequent sintering stage leaves mixer 13 through line 19 and is dropped on the continuously moving grate 21 of a conventional Dwight-Lloyd-type or similar sintering machine, on which it forms a layer 23 about 4 to 6 in. thick. Grate 21 is actuated by rotating rollers 25.

In performing the sintering operation, a stream of air or other oxygen-containing gas is drawn through the layer 23 from the top downwardly by means of a vacuum in space 27, created by suction pump 29. In order to initiate combustion, the surface of layer 23 may be ignited by means of an oil torch or other flame 31. The burning of the sulfur associated with the iron oxide causes the latter to be sintered, that is, to be subjected to a temperature of incipient fusion which causes the formation of relatively large aggregates. During the burning the sulfur is substantially completely consumed. The burning of the sulfur, once ignited, is self-sustaining. In order to aid the sintering process, the layer 23 should be loosely compacted, so as to permit the oxygen-containing gas to flow through the same readily. The water added to mixer 13 acts as a binder suitable for this purpose.

The temperature of the sintering operation should be about 2000° F.–2300° F. for at least a portion of the oxide mass at any time, so that ultimately the entire mass will have been subjected to these temperatures. The operation should be conducted rather rapidly so that the average time for which the iron oxide is subjected to the sintering temperatures referred to is merely a matter of a few minutes.

The sintered oxide which may now contain as little as 0.02% of sulfur, drops off grate 21 in the form of relatively large aggregates which may be cooled with water or air and then screened in a conventional grizzly screen or similar screening means 33. Fines having a particle size of less than about 1.5 in. may be recycled through line 35 to mixer 13 for resintering.

The coarse material leaving screen 33 is the well-known sintered iron pyrites ash which has been previously used (in the reduced state and after promoter addition) as iron-type catalyst for the hydrocarbon synthesis. A typical analysis of this sintered iron pyrites ash is as follows.

| | Parts by weight |
|---|---|
| Total Fe | 68.10 |
| Reducible $O_2$ combined with: | |
| Iron | 27.50 |
| S | 0.05 |
| CaO | 0.82 |
| MgO | 0.80 |
| $SiO_2$ | 1.50 |
| CuO | 0.14 |
| ZnO, MnO and NiO | 0.58 |

The coarse sintered iron pyrites ash having an average particle size of about 2 to 6 in. is passed through line 37 to a crusher 39 in which it is reduced to a particle size of about ⅛"–¼". The crushed material is transferred via line 41 to a mixer 43. An amount of about 5% by weight of coke ground to a size of about 40 mesh and about 5–10% by weight of water which may contain a dissolved promoter, for example about 0.5–3% of potassium carbonate or fluoride, based on pyrites ash, are added to mixer 43 via line 45 and thoroughly mixed with the pyrites ash.

The mixed material is removed from mixer 43 through line 47 and dropped on the moving grate 49 of a second sintering machine of the type described in connection with the previous sintering stage. The sintering procedure is substantially the same as that of the first sintering stage, a solid layer 51 about 4–6 in. thick forming on moving grate 49, the carbon being ignited by an oil torch 53 and the combustion of the carbon being completed by air (or other oxidizing gas) drawn through layer 51 by means of suction pump 54. The air supply is carefully controlled so that the temperature of the pyrites subject to active combustion and sintering at any given time lies between about 2200° F. and 2500° F., that is somewhat above the sintering temperature in the first sintering stage. Upon ignition of the surface the carbon flame continues to move spontaneously across layer 51 while layer 51 moves in the direction of the arrow. The water added to the coke not only facilitates the passage of the oxidizing gas but simultaneously controls the combustion rate across layer 51 by the cooling effect of water distilled from the combustion zone into deeper zones and redistilling from the latter under the influence of the combustion taking place above. In this manner combustion is preferably so controlled that the flame penetrates the layer at a rate of about 5 in. within 6–7 minutes and that any particular portion of layer 51 is exposed to the sintering temperatures mentioned for only about one minute.

By the time the pyrites ash reaches the end of grate 49 substantially all the carbon is consumed. The resintered pyrites ash removed from grate 49, in the form of porous, brittle blocks, is then cooled with air or water, and screened in a conventional screen 55. The coarse material is sent via line 57 to a conventional grinder (not shown) wherein it may be ground to a fluidizable particle size of about 30–200 microns. The fines recovered from screen 55 are preferably recycled through line 59 to mixer 43 for resintering.

The properly ground material of fluidizable size may be reduced in any conventional manner and is then ready to be used as a catalyst for fluid synthesis operation. A typical analysis of the material as removed from screen 55 is about as follows:

| | |
|---|---|
| Total Fe | 67.40 parts by weight |
| Reducible $O_2$ combined with Fe | 28.00 parts by weight |
| Carbon | 0.05 parts by weight |
| Ash weight after heating in air | 101.60% by weight |
| $K_2O$ | 1.0–1.5 parts by weight |
| S | 0.02 parts by weight |
| $SiO_2$, CaO, MgO, Cu, Ni | 4.00 parts by weight |

The disintegration rate of this material is only a fraction of that withdrawn from screen 33, and its activity and selectivity are appreciably higher.

Instead of adding catalyst promoter to mixer 43 as described above, it may be added as a whole or in part to mixer 13 prior to the first sintering stage. If iron oxides derived from sources other than iron pyrites are to be used as starting materials these may be fed directly to crusher 39 or mixer 43 and then treated substantially as described above. Other conventional roasting and sintering means may be used in the production of the sintered pyrites ashes subjected to the treatment of the invention. If the addition of other metals such as copper is desired, a suitable compound of such metal, e. g., the nitrate or carbonate may be added in the desired proportions to mixer 43 or crusher 39, in solid form or dissolved in water. The system illustrated may be modified in various additional ways without deviating from the spirit and scope of the invention.

The invention and its beneficial effects will be further illustrated by the following specific examples.

EXAMPLE 1

A catalyst was prepared substantially as described with reference to the drawing, the mixture in mixer 43 having a composition as follows:

| | Per cent by weight |
|---|---|
| Sintered pyrites ash, ⅛" mesh | 89.7 |
| Potassium fluoride | 2.1 |
| Metallurgical coke, ⅛" mesh | 4.8 |
| Water | 3.4 |
| | 100.0 |

Resintered material was sized to 1/16" particles and reduced with hydrogen for 6 hours at 900° F. and 1000 v./v./hr. The reduced catalyst was tested in fixed bed operation as follows:

| | |
|---|---|
| Temperature, °F. | 600 |
| Pressure, lbs./sq. in. | 250 |
| $H_2$:CO ratio, fresh feed | 1:1 |
| Throughput, v./v./hr. | 200 |
| Yield, cc. of $C_4$+/cu. m. of $H_2$+CO converted | 191 |

These data demonstrate the high activity and selectivity of the catalyst of the invention.

EXAMPLE 2

An ordinary pyrites ash catalyst of the type withdrawn from screen 33 and promoted by impregnation with 2% $K_2CO_3$ (in 8–14 mesh particle size), was reduced with hydrogen for 6 hours at 900° F. and with 5000 v./v./hr. gas rate. This catalyst was tested under fixed bed conditions in a test designated in Table I below as run A.

Catalyst was prepared from sintered pyrites ash and 1½% $K_2CO_3$ by resintering using coke as fuel according to a procedure substantially as described with reference to the drawing. The mixture subjected to resintering had the following composition.

1.4 parts by weight $K_2CO_3$
4.7 parts by weight coke (95% carbon)
4.6 parts by weight water
89.3 parts by weight crushed pyrites ash all passing through ⅛" screen openings and analyzing 0.05% sulfur.

The mixture was spread in a loose porous mass on a grate and after ignition with a flame, was caused to sinter in a draft of air. The coarse portion of this material analyzed 0.01% sulfur. This catalyst was then reduced and tested in a fixed bed unit, the test being designated as run B in Table I below.

Table I

[Fixed bed tests at 600° F., 250 p. s. i. g.]

|  | Run A | Run B |
| --- | --- | --- |
| Catalyst | Conventional | Resintered with C |
| V./V./Hr. | 210 | 192 |
| $H_2$/CO Ratio | 2.03/1 | 2.05/1 |
| Yield, cc. $C_4+$/m.³ $H_2+CO$ Con | 191 | 194 |
| CO Conversion, Output Basis | 95.6 | 91.7 |

The selectivity of the catalyst of the invention (run B) shows an appreciable improvement over the ordinary pyrites ash catalyst. The lower activity may be attributed to the lower promoter content.

EXAMPLE 3

A catalyst disintegration and carbonization test was made on each of the catalysts of runs A and B of Example 1. A new batch of conventional (run A) pyrites ash catalyst (2% $K_2CO_3$) having the following Roller particle size analysis:

Per cent by weight
0–20 microns _____ 8
20–40 microns _____ 6
40–80 microns _____ 25
80+ microns _____ 61 was reduced with hydrogen at 148 v./v./hr. for 30 hours at 900° F. A portion of the preparation resintered with carbon (run B) which had the following particle size distribution:

0–20 microns _____ Trace
20–40 microns _____ 1% by weight
40–80 microns _____ 7% by weight
80+ microns _____ 92% by weight was reduced for 22 hours at 900° F. and 630 v./v./hr. flow rate of hydrogen. The resulting reduced catalyst had a low oxygen content (0.1% compared with 11.1% oxygen for the conventional pyrites ash catalyst after reduction).

The two reduced catalysts were then treated in accelerated carbonization and disintegration tests with scrubbed synthesis gas of 2/1 $H_2$/CO ratio for 7 hours at atmospheric pressure and 700° F. using 0.7 ft./sec. gas velocity. After this treatment, the two catalysts had the following Roller analysis:

|  | Conventional Pyrites Ash 2% $K_2CO_3$ | Pyrites Ash Resintered with C 1½% $K_2CO_3$ |
| --- | --- | --- |
|  | Per cent | Per cent |
| 0–20 microns | 21 | 2 |
| 20–40 microns | 18 | 8 |
| 40–80 microns | 30 | 35 |
| 80+ microns | 31 | 55 |

The disintegration rates calculated from these data and the carbon formation rates found were as follows:

Conventional catalyst:
Disintegration rate: 213 gr. of 0–20 microns formed per 100 gr. of 20+ micron catalyst per 100 hours.
Carbon formation rate: 340 gr. of carbon per 100 gr. of catalyst per 100 hours.
Catalyst resintered with carbon:
Disintegration rate: 32 gr. of 0–20 microns formed per 100 gr. of 20+ micron catalyst per 100 hours.
Carbon formation rate: 388 gr. of carbon per 100 gr. of catalyst per 100 hours.

Thus the catalyst of the invention had only about one seventh the disintegration rate of the ordinary pyrites ash catalyst in spite of its higher carbon formation rate.

Comparative tests on synthetic ammonia catalyst (fused and reduced promoted magnetite) have shown disintegration rates of 68 grams 0–20 microns per 100 grams 20+ microns catalyst per 100 hours and carbon formation rates of about 350 grams of carbon per 100 grams of catalyst per 100 hours.

In addition to exhibiting improved physical strength and selectivities comparable to other catalysts, the pyrites ash catalyst of the invention is much cheaper to prepare, the cost per pound being about 3¢ at present while synthetic ammonia catalyst costs in the neighborhood of 60¢ per pound.

EXAMPLE 4

The utility of the catalysts of the invention for fluid synthesis operation is demonstrated by the data summarized in Tables II and III below.

A catalyst in accordance with the invention containing 1.5% $K_2CO_3$ was prepared substantially as described in Examples 1 and 2 and ground to give the following sieve analysis.

All through _____ 80 mesh
3% _____ 0–20 microns
3% _____ 20–40 microns
17% _____ 40–80 microns
77% _____ 80+ microns This catalyst was tested in fluid operations at the conditions and with the results given in Table II below.

Table II

| Run No. | IIA | IIB | IIC |
| --- | --- | --- | --- |
| Temperature, °F | 650 | 650 | 650 |
| Fresh Feed, $H_2$/CO | 1.5 | 2.1 | 2.6 |
| V./Hr./W | 37 | 44 | 37 |
| Recycle/Fresh Feed | 2.0 | 2.2 | 2.7 |
| Pressure, p. s. i. g | 400 | 400 | 400 |
| CO Conversion, Per Cent | 94.9 | 97.2 | 99.1 |
| $H_2+CO$ Conversion, Per Cent | 88.9 | 86.7 | 85.5 |
| $C_4+$Hydrocarbon, cc./m.³ $H_2+CO$ Consumed | 208 | 163 | 143 |
| Grams of Carbon Formed/m.³ of $H_2+CO$ Consumed | 1.6 | 0.27 | 0.31 |
| Disintegration Rate: Lbs. of 0–20 Microns Formed/100 Lb. of 20+Microns/100 Hours | 47 | Nil | (¹) |

¹ Negligible.

An ammonia synthesis type catalyst was prepared by fusion in an electrical furnace, of a mixture of natural and synthetic magnetites ($Fe_3O_4$) with promoters such as alumina (2–3%) and amounts of potassium salts giving 1.2–2.0% $K_2O$. The material was ground to give the same sieve analysis as tabulated in this example above and reduced. This catalyst was likewise tested in fluid operation as specified in Table III below.

Table III

| Run No. | IIIA | IIIB | IIIC | IIID |
|---|---|---|---|---|
| Hours | 24–179 | 270–364 | 173–215 | 33–368 |
| Temperature, °F | 640 | 650 | 675 | 650 |
| Fresh Feed, $H_2/CO$ | 2.6 | 2.1 | 2.0 | 2.0 |
| V./Hr./W | 43 | 83 | 33 | 8–9 |
| Recycle/Fresh Feed | 2.0 | 2.0 | 1.8 | 5 |
| Pressure, p. s. i. g | 400 | 400 | 400 | 400 |
| CO Conversion, Per Cent | 99.3 | 94.2 | 94 | 97 |
| $H_2$+CO Conversion, Per Cent | 86.1 | 77.6 | 86 | 95 |
| $C_4$+Yield, cc./m.³ $H_2$+CO Consumed | 140 | 172 | 172 | 183 |
| Grams of Carbon Formed/m.³ of $H_2$+CO Consumed | 0.24 | 0.44 | 0.4 | 2.2 |
| Disintegration Rate: Lbs. of 0–20 Microns Formed/100 Lb. of 20+Microns/100 Hours | Nil | (¹) | 10.8 | 13.3 |

¹ Negligible.

A comparison of run IIIA with run IIC shows similar yields of $C_4$+ hydrocarbons and similar carbon deposition rates. These two runs were made under conditions favoring low carbon formation: high $H_2$/CO ratio in the fresh feed, and high hydrogen partial pressure in the total feed. These conditions do not generally favor high yields, for the $H_2/(H_2+C)$ ratio in the total feed is high. This has been found to be conducive to low yields. The yields of $C_4$+ reported here may be described as moderately low.

Runs IIIB, IIIC, and IIB show similarity. These runs were made under conditions favoring high yields: low $H_2$/CO in the fresh feed, and low $H_2/(H_2+C)$ in the total feed.

Run IIA is for conditions favoring high yields and high carbon formation: low $H_2$/CO ratio in fresh feed, low $H_2/(H_2+C)$ ratio in total feed, and low hydrogen partial pressure. Run IIID which gave relatively high yields shows high carbon formation.

The above comparison demonstrates that the catalyst of the invention is at least equal to the much more expensive ammonia synthesis type catalyst in fluid operation with respect to activity, selectivity and disintegration resistance at comparable reaction conditions.

EXAMPLE 5

A catalyst was prepared by mixing 691 parts by weight of iron pyrites ash made as described in connection with the drawing and having a size of less than ⅛", 140.5 parts by weight of copper carbonate analyzing 55% Cu, 63.5 parts by weight of coke having a size smaller than 20 mesh, 11.7 parts by weight of $K_2CO_3$ and 93.3 parts by weight of water, and sintering the mixture by burning the coke, as described in connection with the drawing. This material was reduced at 900° F. and 1000 v./v./hr. of $H_2$ for 6 hours and tested in fixed bed operation as follows:

Table IV

| Temperature, °F | 600 |
|---|---|
| Pressure, p. s. i. g | 250 |
| $H_2$:CO ratio | 2 |
| Feed rate, v./v./Hr | 200 |

| Run Hours | 22–69 | 94–117 | 142–165 |
|---|---|---|---|
| Material Bal., wt. Per Cent CO Conv.: | 93 | 88 | 93 |
| Per Cent Input | 93 | 77 | 96 |
| Per Cent Output | 97 | 96 | 96 |
| $C_4$+: | | | |
| Cc./m.³ $H_2$+CO Fed | 134 | 118 | 121 |
| Cc./m.³ $H_2$+CO Cons | 197 | 186 | 191 |
| Cc./m.³ $H_2$+CO Cons., Calc'd from $C_4$+/$C_1$+Ratio | 191 | 167 | 173 |
| Distr. Ratio, $C_4$+/$C_1$+ | 0.64 | 0.56 | 0.58 |

These data show that addition of copper does not detrimentally affect the activity and selectivity of the carbon sintered catalyst of the invention.

EXAMPLE 6

The disintegration and carbon formation rates of the catalyst of Example 5 were determined by the test described in Example 3. Table IV below summarizes the results in comparison with those obtained from the similar tests of the catalyst of run B in Example 2.

Table IV

| Catalyst Resintered with Coke | Run B of Example 2 (no Cu) | Example 5, 10% Cu |
|---|---|---|
| DISINTEGRATION TEST | | |
| Carbon Formation, Rate gr. of C/100 gr. of Catalyst/100 Hours | 388 | 380 |
| Disintegration Rate, gr. 0–20 microns/100 gr. of 20+ microns/100 Hours | 32 | 15 |
| FIXED BED TEST AT COMPARABLE CONDITIONS | | |
| Temperature, °F | 600 | 600 |
| Feed $H_2$/CO Ratio | 2/1 | 2/1 |
| Activity, Per Cent CO Conv | 92 | 96 |
| Selectivity, cc. $C_4$+/m.³ $H_2$+CO Consumed | 194 | 182 |

The above data show that the addition of copper to the catalyst of the invention affords an increased activity and a slight further reduction in disintegration rate without significant effects on catalyst selectivity.

What is claimed is:

1. The process of preparing iron type catalysts for the catalytic conversion of CO with $H_2$ which comprises mixing sintered iron pyrites ash with a minor proportion of carbon, contacting the mixture with an extraneous gas containing free oxygen at conditions conducive to combustion of said carbon, recovering a resintered iron oxide and subjecting said resintered iron oxide to a reducing treatment with a gas rich in hydrogen.

2. The process of claim 1 in which said temperature is between about 2200° and 2500° F.

3. The process of claim 1 in which a minor proportion of water is added to said mixture.

4. The process of claim 1 in which said mixture is subjected to said temperature for a time of about 0.5–2 minutes.

5. The process of claim 1 in which an alkali metal compound promoter is added to said iron pyrites ash prior to said sintering treatment.

6. The process of claim 1 in which said re-sintered iron oxide is ground to a fluidizable particle size.

7. The process of preparing iron type catalysts for the catalytic conversion of CO with $H_2$ which comprises mixing subdivided sintered iron pyrites ashes with about 2–8% of carbon and about 3–10% of water, subjecting the mixture to carbon combustion with an oxidizing gas at a temperature of about 2200°–2500° F. for about 0.5–2 minutes to resinter the pyrites ashes, crushing and screening the resintered ashes, and sizing a coarse portion of the screened resintered ashes to a fluidizable size.

8. The process of claim 7 in which a fine portion of said screened ashes is returned to said mixture.

9. The process of claim 7 in which an alkali metal compound promoter is added to said water.

10. The process of claim 7 in which said sintered iron pyrites ashes are prepared by roasting iron pyrites, mixing the roasted pyrites with a minor proportion of fresh pyrites and a minor proportion of water containing an alkali metal compound promoter and subjecting the mixture to a sulfur combustion with an oxidizing gas at a temperature conducive to sintering of said pyrites.

DON R. McADAMS.
MARNELL A. SEGURA.

REFERENCES CITED

The following references are of record in the file of this patent:

UNITED STATES PATENTS

| Number | Name | Date |
|---|---|---|
| 1,379,387 | Bosch et al. | May 24, 1921 |
| 1,502,260 | Lucas | July 22, 1924 |
| 2,183,145 | Michael et al. | Dec. 12, 1939 |
| 2,365,094 | Michael et al. | Dec. 12, 1944 |
| 2,417,164 | Huber | Mar. 11, 1947 |
| 2,455,419 | Johnson | Dec. 7, 1948 |
| 2,462,861 | Gunness | Mar. 1, 1949 |
| 2,476,920 | Segura | July 19, 1949 |
| 2,479,420 | Segura | Aug. 16, 1949 |
| 2,481,841 | Hemminger | Sept. 13, 1949 |